United States Patent
Kim et al.

(10) Patent No.: US 9,654,435 B2
(45) Date of Patent: May 16, 2017

(54) ELECTRONIC DEVICE AND METHOD FOR MANAGING GROUP E-MAIL

(71) Applicant: Samsung Electronics Co., Ltd., Gyeonggi-do (KR)

(72) Inventors: Han-Jib Kim, Gyeonggi-do (KR); Yong-Sik Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 140 days.

(21) Appl. No.: 14/293,263

(22) Filed: Jun. 2, 2014

(65) Prior Publication Data

US 2015/0019656 A1    Jan. 15, 2015

(30) Foreign Application Priority Data

Jul. 12, 2013  (KR) .......................... 10-2013-0081893

(51) Int. Cl.
*G06F 15/16* (2006.01)
*H04L 12/58* (2006.01)

(52) U.S. Cl.
CPC .............. *H04L 51/16* (2013.01); *H04L 51/02* (2013.01); *H04L 51/34* (2013.01)

(58) Field of Classification Search
CPC ..... G06F 15/16; G06Q 10/107; H04L 12/585; H04L 12/58; H04L 12/581; H04L 12/5855

USPC .......................................... 709/206
See application file for complete search history.

(56) References Cited

U.S. PATENT DOCUMENTS

| | | | | |
|---|---|---|---|---|
| 5,895,468 A | * | 4/1999 | Whitmyer, Jr. | G06Q 10/10 705/26.1 |
| 2004/0249890 A1 | * | 12/2004 | Fellenstein | H04L 12/587 709/206 |
| 2007/0061423 A1 | * | 3/2007 | Accapadi | G06Q 10/107 709/219 |
| 2008/0052362 A1 | | 2/2008 | Bauchot et al. | |

FOREIGN PATENT DOCUMENTS

| | | |
|---|---|---|
| JP | 8-167913 A | 6/1996 |
| KR | 10-0654542 B1 | 11/2006 |
| KR | 10-2007-0094269 A | 9/2007 |

* cited by examiner

*Primary Examiner* — Suraj Joshi
*Assistant Examiner* — Jaren M Means
(74) *Attorney, Agent, or Firm* — Cha & Reiter, LLC

(57) ABSTRACT

A method and apparatus for managing group e-mails in an electronic device is provided. A group e-mail message including a request to receive a reply e-mail by a first time may be transmitted to e-mail addresses of at least two recipients. It is automatically determined whether reply e-mails are received from the at least two recipients by a second time. When there is at least one recipient from whom the reply e-mail was not received by the second time, a reminder e-mail is transmitted to the at least one recipient from whom the reply e-mail is not received.

20 Claims, 8 Drawing Sheets

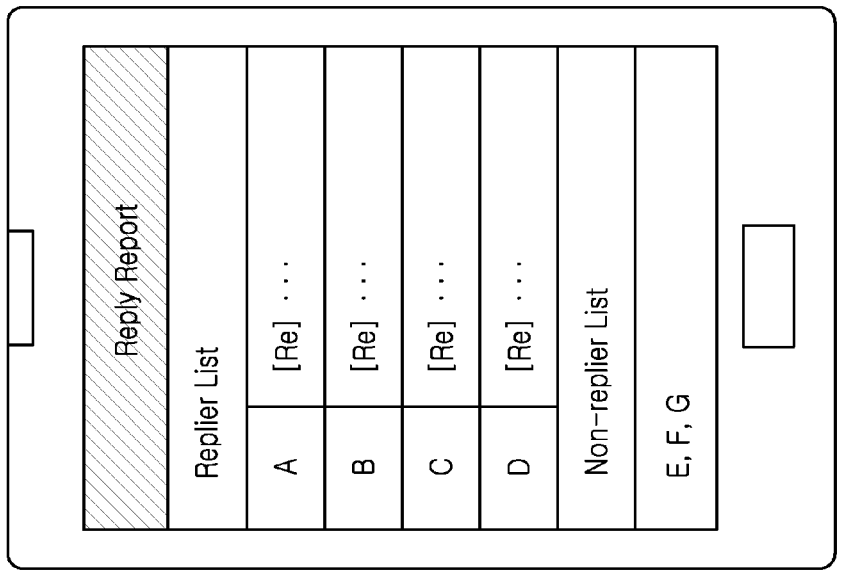
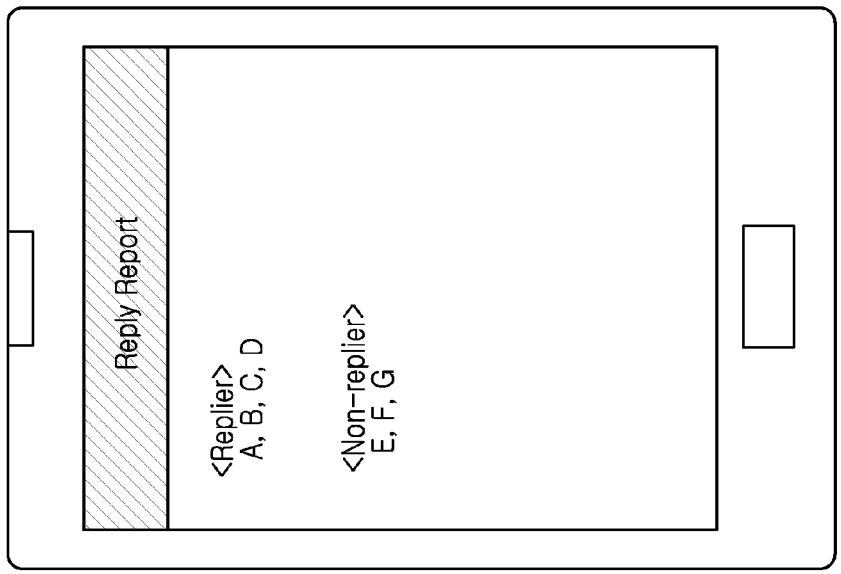
FIG.3B
FIG.3A

ELECTRONIC DEVICE AND METHOD FOR MANAGING GROUP E-MAIL

CROSS REFERENCE TO RELATED APPLICATION

This application claims priority under 35 U.S.C. §119 to an application filed in the Korean Intellectual Property Office on Jul. 12, 2013 and assigned Serial No. 10-2013-0081893, the contents of which are incorporated herein by reference.

TECHNICAL FIELD

The present disclosure relates to electronic mail, and, more particularly, to a method and apparatus for managing group electronic mail.

BACKGROUND

Group e-mail functionality enables transmission of a single e-mail message to a plurality of recipients using an electronic device, and greatly enhances user convenience.

Currently, there is no function for automatically managing information on whether a reply e-mail has been received from each recipient after the transmission of one message to a plurality of recipients using the group e-mail function. A user must instead checks whether a reply e-mail was received from each transmission recipient, respectively, from a plurality of recipients.

SUMMARY

One aspect of the present disclosure provides an apparatus and method for determining, in response to a transmission of a group e-mail, whether a reply e-mail has been received from a recipient by a predetermined time, and automatically sending a reminder e-mail to recipients from which e-mail replies have not yet been received, thereby improving the rate of e-mail reply.

Another aspect of the present disclosure provides an apparatus and method for generating a reply report distinguishing between persons that have replied by e-mail within a predetermined time from persons that have not replied by e-mail within the predetermined time, thereby allowing a user to quickly determine who has and has not replied, thus improving the user's convenience.

Another aspect of the present disclosure provides an apparatus and method for composing different e-mail contents respectively with respect to a person that has sent a reply e-mail and a person that has not sent the reply e-mail when a group e-mail is transmitted, thereby improving availability of the reply report.

According to an aspect of the present disclosure, a method for operating an electronic device includes transmitting a group e-mail message to e-mail addresses of at least two recipients, the group e-mail message including a request to receive a reply e-mail by a first time. It is determined whether reply e-mails are received by a second time from the at least two recipients, and when a reply e-mail has not been received from at least one recipient by the second time, a reminder e-mail is automatically transmitted to the at least one recipient from whom the reply e-mail was not received.

Transmitting the group e-mail message may further include receiving one or more inputs indicating that a request for the reply e-mail should be made, a setting of a request reply time or first time, or e-mail message content.

The first time may be a request reply time. The second time may be a predetermined time set earlier than the first time. The method may include determining whether the first time has elapsed. The method may further include generating a reply report having a predetermined format when the first time has elapsed, and providing the reply report.

The generating of the reply report may include classification of the at least two recipients respectively into "repliers" that have sent a reply e-mail, and "non-repliers" that have not sent a reply e-mail. The generating of the reply report may include transmitting the generated reply report to a predetermined e-mail address. The generating the reply report may include storing the generated reply report in a predetermined storage area. The generated reply report may include content of each reply e-mail which each respective replier has sent.

According to another aspect of the present disclosure, an electronic device includes memory and a processor. The processor may be configured to transmit a group e-mail message including a request for a reply e-mail to be received by a first time. The group e-mail message may be transmitted to e-mail addresses of at least two recipients. When a reply e-mail is not received by the second time, a reminder e-mail is sent to the at least one recipient from whom the reply e-mail was not received.

The electronic device may further include a touchscreen for receiving, for example, an input indicating that the reply e-mail is requested, or a first time or request reply time.

The first time may be the request reply time. The second time may be a predetermined time set earlier than the first time. The processor may be configured to determine whether the first time has elapsed.

The processor may be configured to generate a reply report having a predetermined format when the first time has elapsed. The processor may be configured to classify, according to the predetermined format, the at least two recipients respectively into "repliers" that have sent a reply e-mail, and "non-repliers" that have not sent a reply e-mail.

The processor may be configured to transmit the generated reply report to a predetermined e-mail address. The processor may be configured to store the generated reply report in a predetermined storage area in the memory. The processor may be configured to include content of each reply e-mail for each replier that has sent in the reply report.

BRIEF DESCRIPTION OF THE DRAWINGS

The above features and advantages of the present disclosure will become more apparent from the following detailed description when taken in conjunction with the accompanying drawings in which:

FIG. 3A and FIG. 3B are diagrams illustrating an example embodiment of providing a reply report in an electronic device according to the present disclosure;

DETAILED DESCRIPTION

Example embodiments of the present disclosure will be described herein below with reference to the accompanying drawings. In the following description, detailed descriptions of well-known functions or configurations will be omitted since they would unnecessarily obscure the subject matter of the present disclosure. Also, the terms used herein are defined according to the functions of the present disclosure. Thus, the terms may vary depending on users' or operators' intentions or practices. Therefore, the terms used herein should be understood based on the descriptions made herein.

Figure 1A:
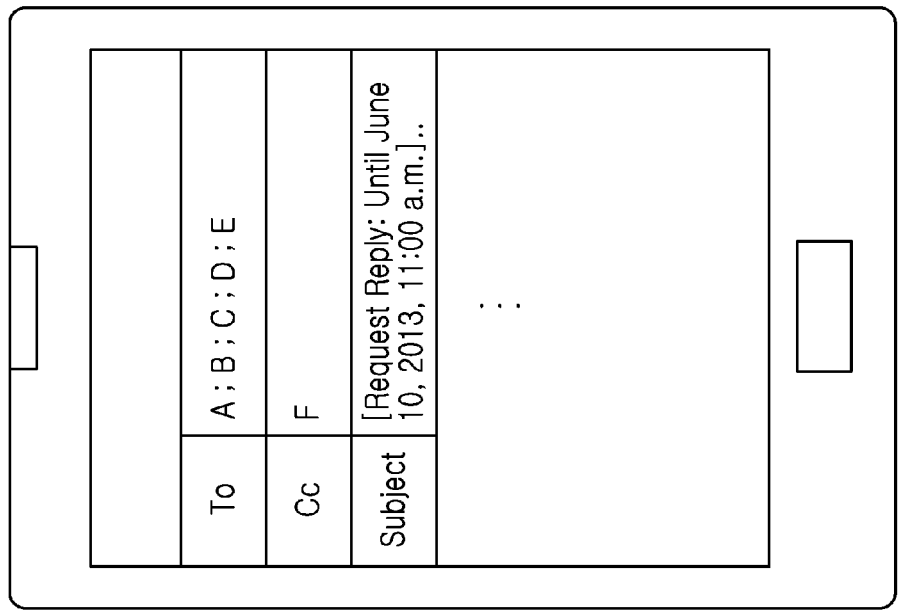
FIG. 1A and FIG. 1B are diagrams illustrating an example embodiment of setting a request reply time and transmitting a reply e-mail according to the present disclosure.
Figure 1B:
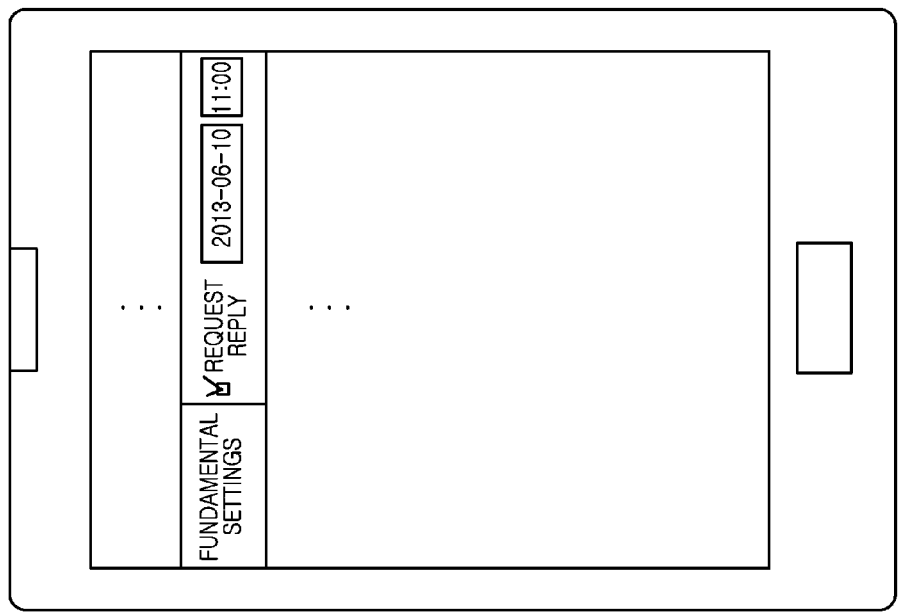

FIGS. 1A and 1B are diagrams illustrating an example embodiment of setting a request reply time, and transmitting a reply e-mail according to an embodiment of the present disclosure. An e-mail may be transmitted to at least two recipients, the e-mail requesting a reply e-mail to arrive by some first time. Specifically, the electronic device may set a plurality of recipients, and send a group e-mail to the recipients that includes a request for replies to be returned by a predetermined first time. In this case, the predetermined first time may be defined as the request reply time.

An example scenario may involve a user who wishes to send a group e-mail to team members inquiring whether to attend an event scheduled to start at 2:00 p.m. Because the user needs to prepare educational materials associated with the seminar and arrange seats. Reply e-mails from the respective team members as required to estimate the required quantity of materials and seats to prepare. Accordingly, the user may set the request reply time to 11:00 a.m., which is earlier than the seminar start time of 2:00 p.m., and send a group e-mail to all team members. This allows the user to estimate and complete preparations for the seminar. An embodiment of setting a request reply time and sending a group e-mail in an electronic device will be described below in detail.

First, the electronic device receives a command requesting a reply e-mail for a group e-mail under composition. Thereafter, the electronic device may receive inputs of e-mail content, a reply time, and the e-mail addresses of a plurality of recipients. For example, as illustrated in FIG. 1A, a user may input to the electronic device a selection of "request reply", indicating that a reply e-mail is requested, and a reply date and a reply time, indicating the deadline for a reply. After the user has completed inputting e-mail content, the request reply time and the e-mail recipients into the e-mail message, the electronic device may transmit the e-mail message content to the recipients.

Alternatively, the electronic device may in some embodiments identify that a specific term or terms in the e-mail subject header as a command for requesting a reply e-mail. For example, as illustrated in FIG. 1B, the electronic device may identify that the terms "Request Reply" in the e-mail subject header indicates that a reply e-mail is desired, and "Jun. 10, 2013, 11:00 a.m." may indicate the desired reply date and time limit. The e-mail message may then be transmitted to a plurality of recipients A, B, C, D, and E.

In sum, to indicate that a reply e-mail is requested, the electronic device may receive a user selection indicating as much, or it may recognize a predetermined term in the e-mail subject header. One the e-mail message is prepared, the electronic device may transmit the e-mail to the plurality of recipients, including the e-mail content and the request for a reply by a set reply time.

Figure 2A:
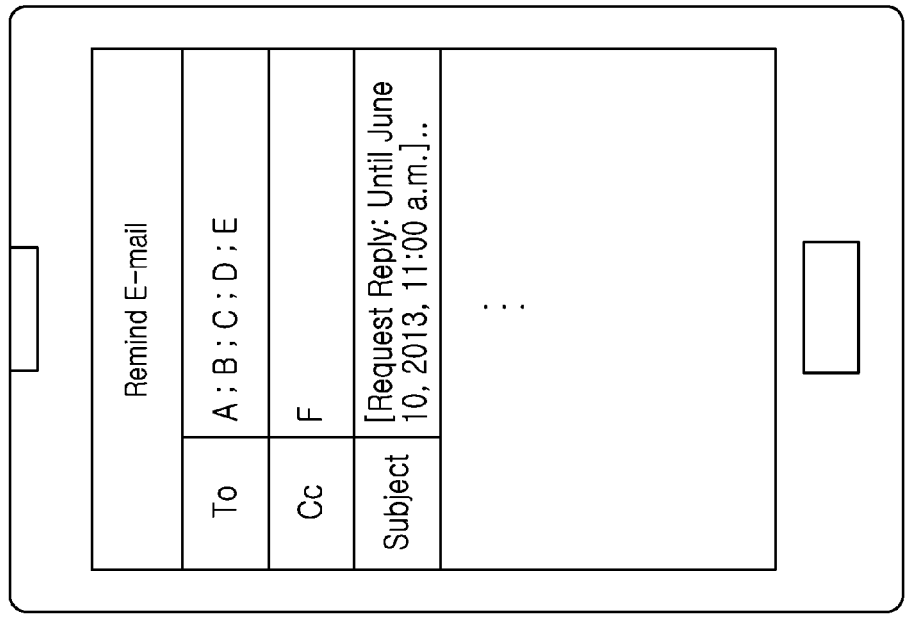
FIG. 2A and FIG. 2B are diagrams illustrating an example embodiment of sending a reminder e-mail to a recipient that has not sent a reply e-mail according to the present disclosure.
Figure 2B:
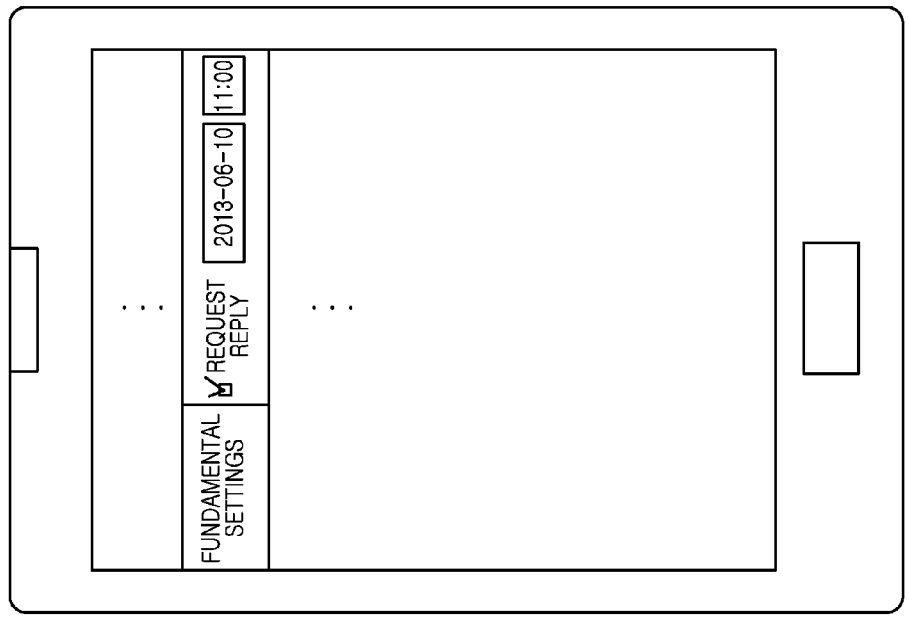

FIGS. 2A and 2B are diagrams illustrating an example embodiment where a reminder e-mail is sent to a recipient that has failed to send a reply e-mail. First, the electronic device may transmit an e-mail requesting a reply e-mail to arrive by the pre-set first reply time. The e-mail request may be transmitted to all or some e-mail addresses of the plurality of recipients.

For example, as illustrated in FIG. 2A, a user may input to the electronic device a selection for a "Request Reply", thereby indicating that a reply e-mail is requested, and an input of a reply date and a reply time, such as, for example, "Jun. 10, 2013, 11:00 a.m." The electronic device may send the reply date and reply time along with message content for the body of the e-mail, such as, "Hello, our department is having a get-together at restaurant H tomorrow at 7:00 p.m. Please send a reply e-mail including information about whether you will be attending for reservation purposes." The composed e-mail message may thus be transmitted to a plurality of recipients A, B, C, D, E, and F.

Thereafter, the electronic device may determine whether a reply e-mail was received within the pre-determined "second time" timeframe from each recipient. Herein, the "second time" may be defined as a predetermined time that concludes before the "first time" timeframe. The "second time" may thus be used to transmit reply request reminder e-mails, as shown in FIG. 2B, instructing recipients to reply before the "first time" has expired. The electronic device may determine whether the reply e-mail was received respectively from each recipient by the predetermined second time.

When the electronic device determines that there are recipients that have not sent the reply e-mail by the pre-determined second time, the electronic device may send a reminder e-mail to the recipients that have not yet replied. The above-described example may illustrate. The first time is "Jun. 10, 2013, 11:00 a.m.," and the second time is "Jun. 10, 2013, 10:30 a.m." It is assumed that recipients that have received a group e-mail are A, B, C, D, E, and F and, of the recipients, recipients that have not sent the reply e-mail by the second time are A-E.

In the above-described example, the electronic device may select "A; B; C; D; E" of the recipients to which the group e-mail has been sent, and send a reminder e-mail. The reminder e-mail may have content identical to that of the initial group e-mail, or it may contain predetermined content in addition to the content of the initial group e-mail. For example, the electronic device may automatically send a remind e-mail having the message, "Hello, our department is having a get-together at restaurant H tomorrow 7:00 p.m. Please, send a reply e-mail including information about whether you will be attending for reservation purposes" to the recipients "A; B; C; D; E" at the second time, or 10:30 a.m. on Jun. 10, 2013.

There is typically no functionality enabling automatic determination as to whether a reply has been received from each recipient of a group e-mail. This is highly inconvenient as it forces users to manually determine which recipient has not replied to the group e-mail.

According to one embodiment of the present disclosure, the electronic device facilitates automatic transmission of a reminder e-mail to the recipients that have not sent a reply e-mail, thereby improving a reply rate. In addition, since the electronic device according to the present disclosure automatically classifies recipients that have sent the reply e-mail and recipients that have not sent the reply e-mail, the user no longer has to manually determine who has replied to the group e-mail, greatly reducing inconvenience.

FIGS. 3A and 3B are diagrams illustrating provision of a reply report in an electronic device according to an example embodiment of the present disclosure. First, when the electronic device determines that a first time has elapsed, the electronic device may generate a reply report having a predetermined format. The predetermined format may be, for example, a particular file format, such as text-based file format or a spreadsheet-based file format. The predetermined format may also including formatting, informational tags, or other data elements that distinguishes a replier (i.e., someone who has sent a reply e-mail) from a non-replier (i.e., someone who has failed to reply).

In one illustrative example, the electronic device receiving a setting of a request reply time, and sends a group e-mail to recipients A, B, C, D, E, F, and G. The recipients A, B, C, and D properly reply within the requested reply time, while the recipients E, F, and G fail to reply by the requested reply time.

In the illustrative example portrayed in FIG. 3A, the electronic device may provide the reply report in which the recipients A, B, C, and D who have replied are classified as repliers, and the recipients E, F, and G that have failed to reply are classified as non-repliers.

As illustrated in FIG. 3B, the electronic device may attach each replier's reply e-mail to their respective names or e-mail address. Visually organizing the repliers and their reply e-mails in this many allows fast visual inspection and identification of the relevant reply e-mail in conjunction with classification of recipients into repliers and non-repliers. For example, the electronic device may classify the recipients A, B, C, and D that have replied by the first time into repliers, and the recipients E, F, and G that have not replied by the request reply time into non-repliers, and, simultaneously, display attached reply e-mails to the respective names of A, B, C, and D.

There is typically no functionality enabling automatic determination as to whether a reply has been received from each recipient of a group e-mail. This is highly inconvenient as it forces users to manually determine which recipient has not replied to the group e-mail.

According to one embodiment of the present disclosure, the electronic device may generate a reply report, in which that recipients that have replied by the requested reply time are classified as repliers, and recipients that have not replied by the requested reply time are classified as non-repliers. The reply report may be used by a user to determine who has and has not replied to a group e-mail. In addition, the reply report may provide a reply rate of the recipient group.

Figure 4A:
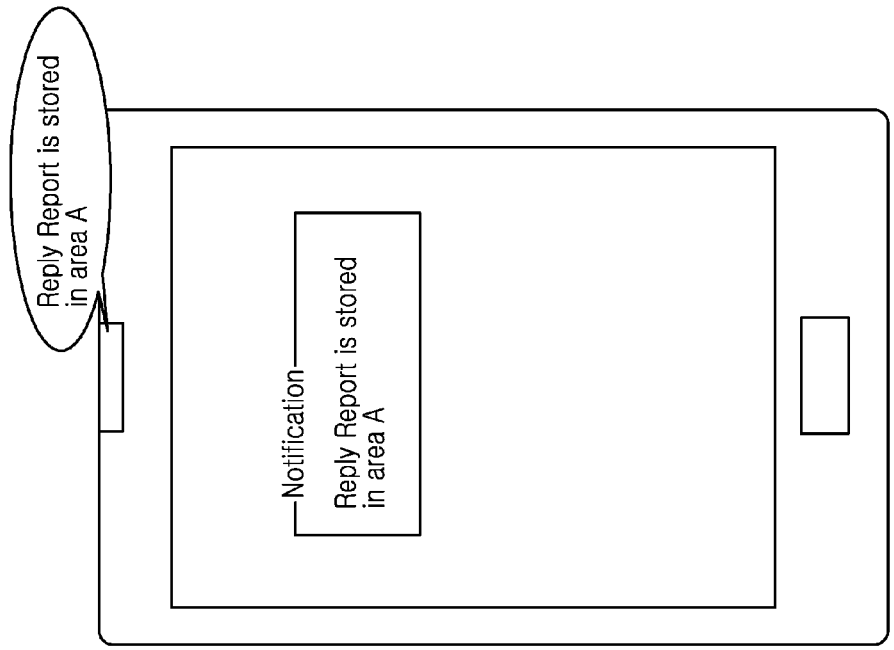
FIG. 4A and FIG. 4B are diagrams illustrating an example embodiment of providing a reply report in an electronic device according to the present disclosure.
Figure 4B:
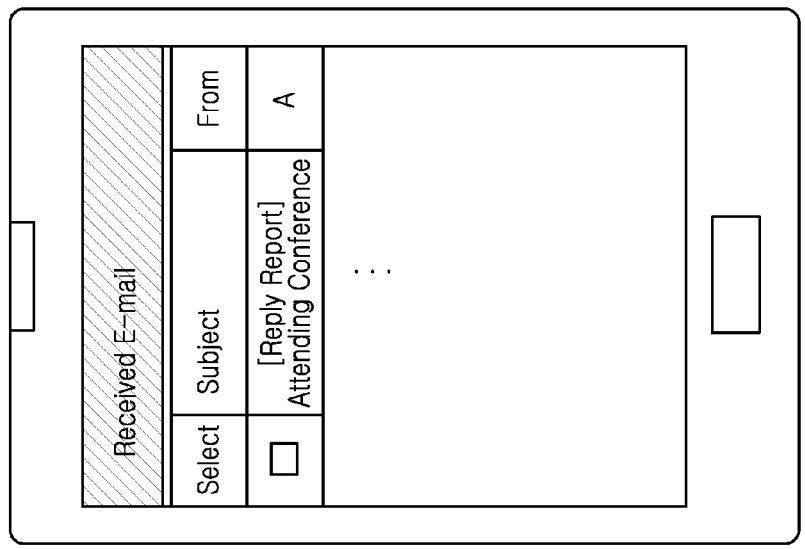

FIGS. 4A and 4B are diagrams illustrating a second embodiment of providing a reply report in an electronic device according to the present disclosure. First, when the electronic device determines that a first time has elapsed, the electronic device may generate a reply report having a predetermined format. Specifically, when the electronic device determines that a request reply time has elapsed, the electronic device may provide a reply report having the predetermined format.

As illustrated in FIG. 4A, the electronic device may send a generated reply report to a predetermined e-mail address. The predetermined e-mail address may be, for example, assigned to the user of the electronic device. For example, when the electronic device receives a reply from recipient "B" (of the above example) and the request reply time has elapsed, the electronic device may transmit the generated reply report to an e-mail address assigned to the user A, who is the user assigned to the electronic device.

As illustrated in FIG. 4B, the electronic device may store the generated reply report in a predetermined storage area, such as a predetermined storage area or memory portion of the electronic device. For example, when the electronic device receives a reply e-mail from recipient A and the request reply time has elapsed, the electronic device may display an indication that the generated reply report is stored in a predetermined storage area "A." This message may be displayed on the touchscreen of the electronic device. Alternatively or simultaneously, the electronic device may provide audio cues, such as a voice reciting, "the reply report is stored in storage area A" via a speaker included in the electronic device.

Manual storage of the reply report in a separate storage area is therefore unnecessary, and the reply report generated by the electronic device is always available for review, thereby increasing user convenience, as the stored reply report is easily retrievable in future.

FIGS. 5A through 5D are diagrams illustrating utilizing an example reply report provided by an electronic device according to the present disclosure. In this example, it is assumed that the electronic device has received a setting of a requested reply time, and sent a group e-mail to recipients A, B, C, and D. Recipients A and B have replied within the requested reply time and recipients C and D have not. After the request reply time has elapsed, the electronic device generates a reply report conforming to a predetermined format, and transmits the report to an e-mail address assigned to the user of the electronic device. Alternatively, or simultaneously, the report may be stored in a predetermined area of the electronic device. In addition, the user may wish to send different e-mails to repliers and non-repliers in future, respectively.

Figure 5A:
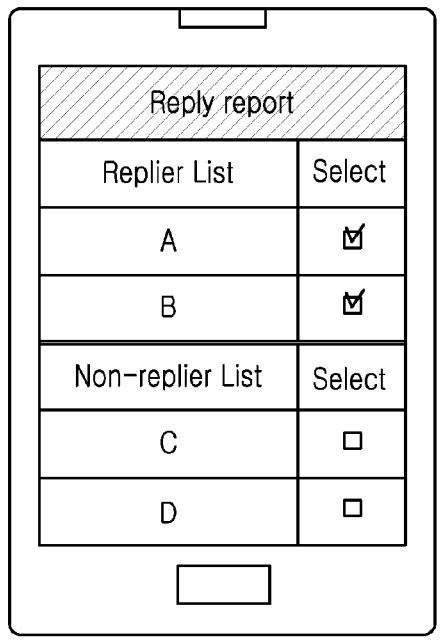
FIG. 5A, FIG. 5B, FIG. 5C and FIG. 5D are diagrams illustrating an example embodiment of utilizing a reply report provided by an electronic device according to the present disclosure.
Figure 5B:
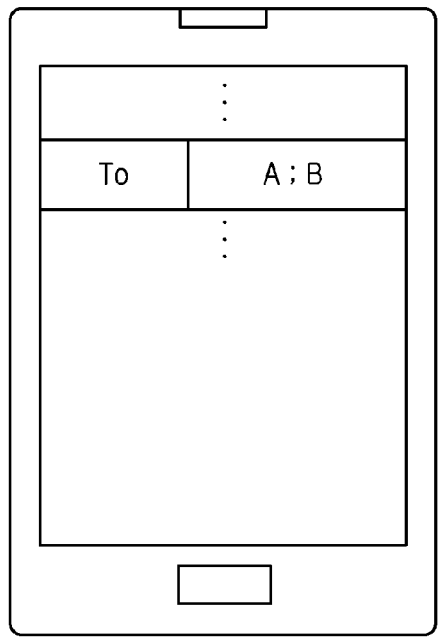

Accordingly, the electronic device may receive a command for displaying the generated reply report, and, in response, display the reply report with a format that classifying recipients into repliers and non-repliers. The reply report may be displayed on, for example, the touchscreen of the electronic device. As illustrated in FIGS. 5A and 5B, the electronic device may then receive a selection from the user for recipients A and B, both indicated as repliers, and execute transmission of an e-mail having particular precomposed content (that may have been written for repliers) to A and B, as illustrated in FIGS. 5A and 5B. That is, the electronic device may send an e-mail including precomposed content to repliers A and B that have sent a reply e-mail, for which the reply rates are high.

Figure 5C:
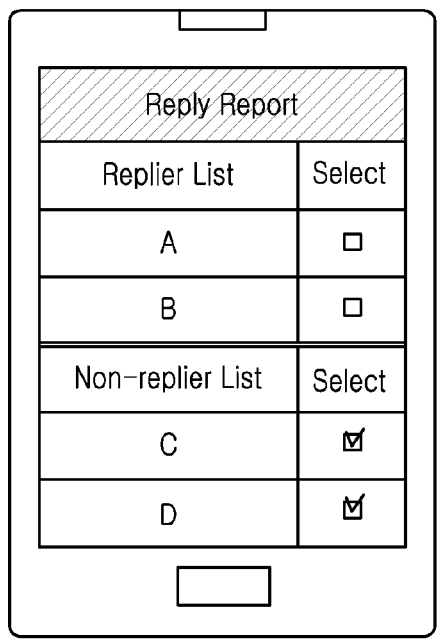
Figure 5D:
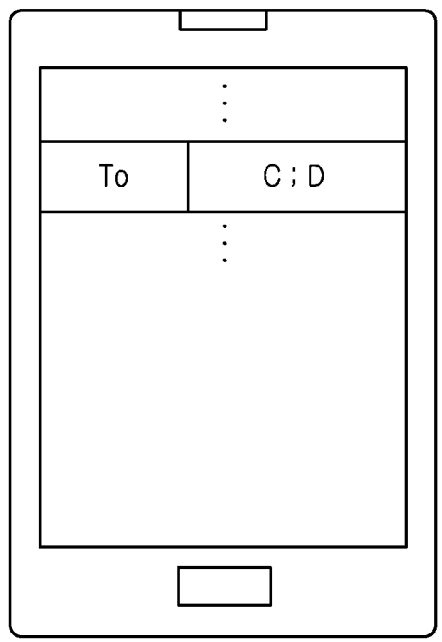

The electronic device may also receive a user selection of C and D, who are both classified as non-repliers that have not sent a reply e-mail, as indicated in the reply report. The electronic device may thus perform transmission of an e-mail having content precomposed to be sent to non-repliers, such as C and D, as illustrated in FIGS. 5C and 5D. That is, the electronic device may send an e-mail having precomposed non-replier content, different from the content composed for repliers (such as that transmitted to repliers A and B). The precomposed non-replier content may thus be transmitted to non-repliers C and D that have not sent a reply e-mail, for whom the reply rates are low.

According to one embodiment of the present disclosure, the electronic device thus provides a reply report classifying users that have replied into repliers and users that have not replied into non-repliers. The reply report thus provides reply information that may be utilized usefully when a user wants to send a group e-mail, analyze who has replied and who has not replied, and transmit precomposed messages to recipients according whether each recipient is a replier or non-replier.

Figure 6:
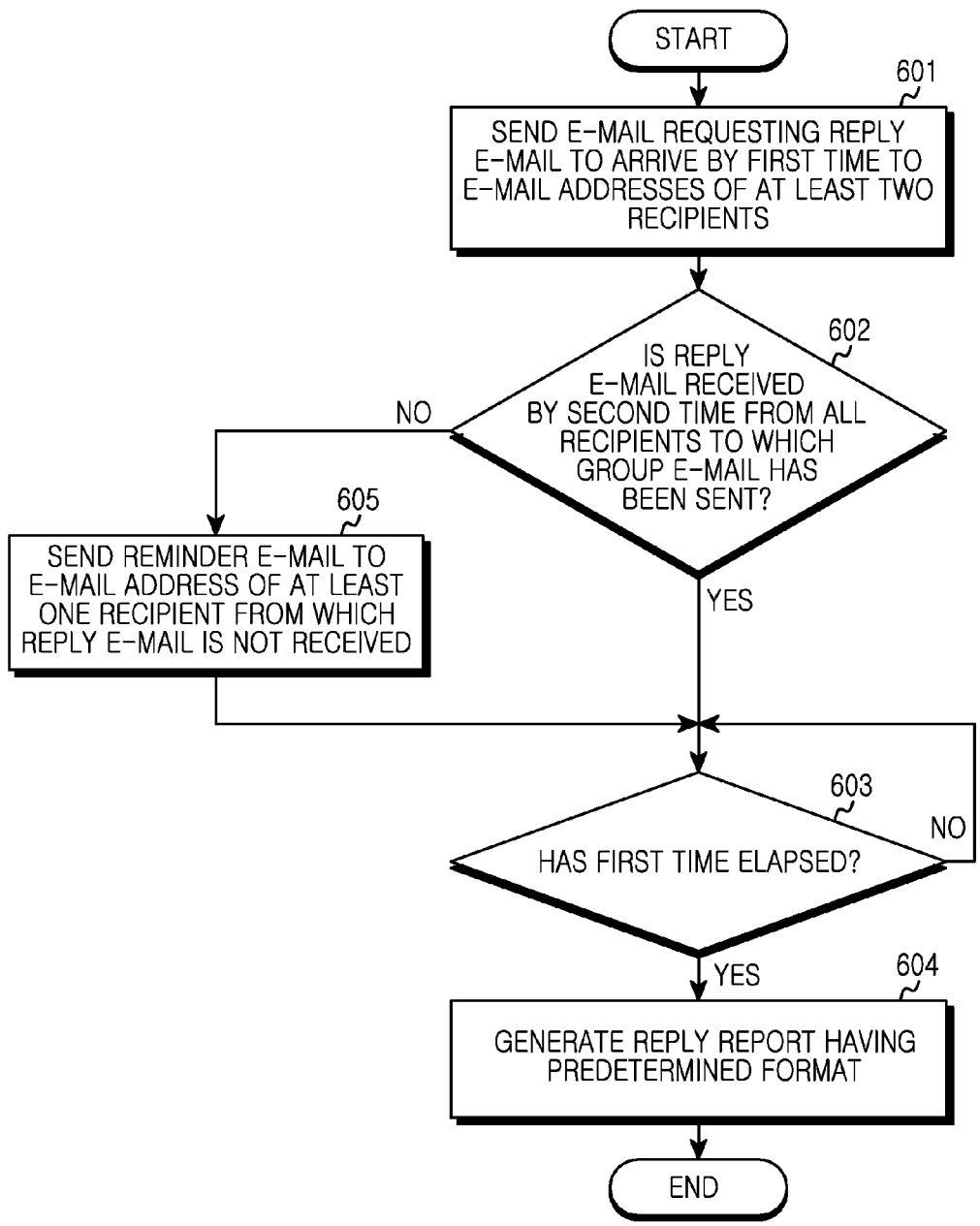
FIG. 6 is a flowchart illustrating an example sequence of steps for managing group e-mail according to an embodiment of the present disclosure.

FIG. 6 is a flowchart illustrating an example sequence of steps implementing managing group e-mails according to one embodiment of the presence disclosure. First, in step 601, an electronic device may transmit an e-mail including a request such that a reply to the transmitted e-mail is received by a predetermined "first time" timeframe. The e-mail may be transmitted to the e-mail addresses of at least two recipients, as illustrated in FIG. 6. Specifically, the electronic device may set a plurality of recipients and send a group e-mail that includes a request to reply within a first time.

In step 602, the electronic device may determine whether the reply e-mail is received from each recipient of the group e-mail within a predetermined "second time" timeframe. As disclosed above, the second time designates a time ending before the first time, and may thus be utilized to demarcate the time in which a preliminary assessment of recipient e-mails is conducted. If replies have not yet been received, then in step 605, the electronic device may transmit reminder e-mails asking recipients to reply before the first time expires. That is, the second time marks a time before the request reply time, and the electronic device may determine whether each recipient has sent a reply e-mail. Upon determining whether the reply e-mail is received from each recipient of the plurality of recipients, a reminder e-mail may be transmitted to recipients that have not yet transmitted a reply e-mail.

If the electronic device determines that the reply e-mail has been received from the recipients by the expiration of the second time in step 602, then no reminder e-mails need to be transmitted, as all required replies are present.

In step 603, electronic device may determine whether the first time has expired. Upon expiration of the first time, the electronic device may determine whether the request reply time has elapsed.

When the electronic device determines that the first time that is the request reply time has elapsed in step 603, the electronic device may generate the reply report according to a predetermined format in step 604. For example, the electronic device may transmit the generated reply report to an e-mail address assigned to the user of the electronic device, or store the generated reply report in a predetermined storage area of the electronic device.

If the electronic device determines that a reply e-mail has not been received from any particular recipient by the second time in step 602, the electronic device may transmit a reminder e-mail to at least one recipient from whom the reply e-mail was not received in step 605. Specifically, when the electronic device determines that a reply has not been received from a recipient of the group e-mail by a predetermined second time earlier than the request reply time, the electronic device may automatically send a reminder e-mail to non-repliers.

Additionally, if the electronic device determines that the request reply time has not elapsed in step 603, the electronic device may, for example, periodically check the current time to determine whether the request reply time has elapsed, until the request reply time is confirmed as elapsed.

Figure 7:
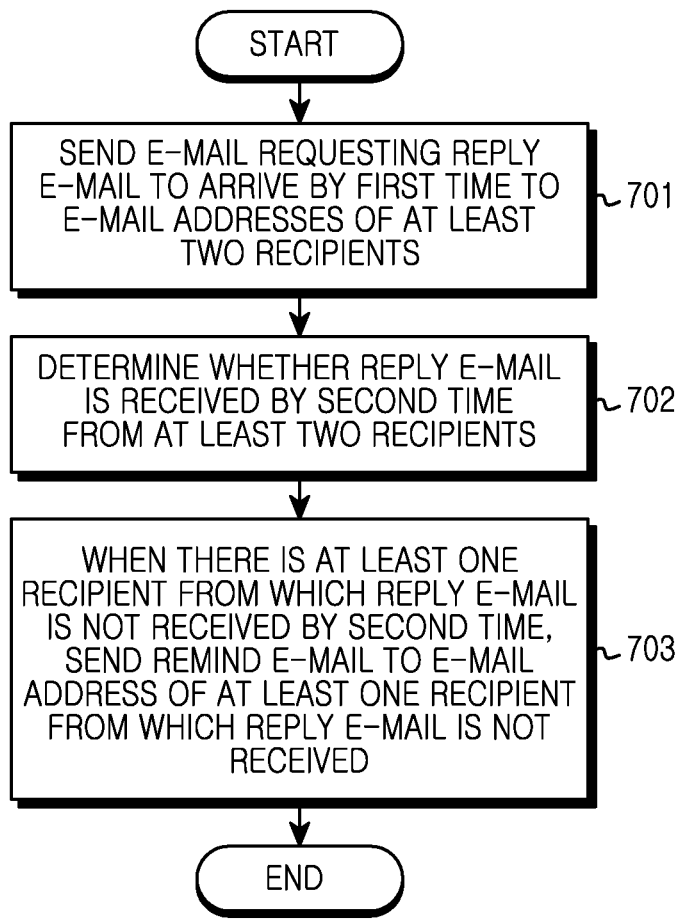
FIG. 7 is a flowchart illustrating an example sequence of steps for managing a group e-mail according to an embodiment of the present disclosure.

FIG. 7 is a flowchart illustrating an example sequence of steps for managing a group e-mail according to an example embodiment of the present disclosure. In step 701, an electronic device may send an e-mail that includes a request for a reply e-mail to arrive by a first time. The e-mail may be transmitted to the e-mail addresses of at least two recipients, as illustrated in FIG. 7. Specifically, the electronic device may set a plurality of recipients and send a group e-mail that includes a request for a reply e-mail to arrive by a predetermined first time to the e-mail addresses of the set recipients. In this case, the predetermined first time may be defined as the request reply time.

In step 702, the electronic device may determine whether, for each recipient, the reply e-mail has arrived by the second time, from the at least two recipients. Herein, the second time may be defined, for example, as a predetermined time set to expire before the predetermined first time. At the second time, the electronic device may determine whether a reply e-mail has been received from the at least two recipients. This is done to enable transmission of a reminder e-mail to recipients who have failed to transmit a reply, and provide them with time to reply before the expiration of the predetermined first time.

Thereafter, when there is at least one recipient from whom the reply e-mail was not received by the second time, the electronic device may send a reminder e-mail to the recipient from whom the reply e-mail was not received in step 703.

It may often be difficult to determine if a reply e-mail has been received from any particular recipient or recipients after the transmission of a group e-mail. That is, it is highly inconvenient for a user to determine whether reply e-mails have arrived from each of a plurality of recipients, after a user has sent a group e-mail to the plurality of recipients. According to the present disclosure, an electronic device automatically sends reminder e-mails to recipients that have failed to send a reply e-mail, thereby improving an overall reply rate.

Figure 8:
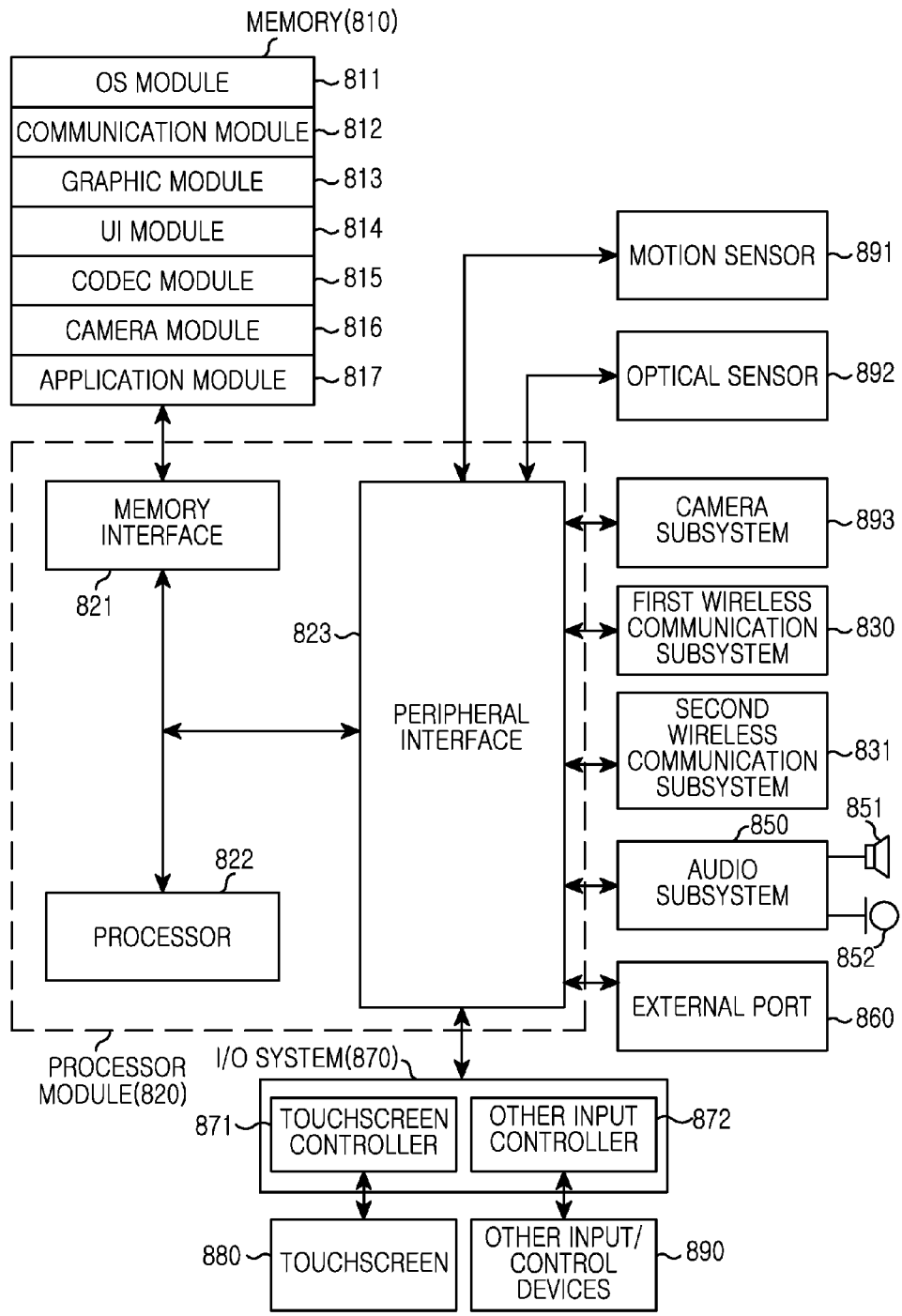
FIG. 8 is a block diagram illustrating a configuration of an electronic device according to an example embodiment of the present disclosure.

FIG. 8 is a block diagram illustrating a configuration of an electronic device according to an embodiment of the present disclosure. The electronic device 800 may be a portable electronic device, and examples thereof may include a portable terminal, a mobile phone, a mobile pad, a media player, a tablet computer, a handheld computer, or a Personal Digital Assistant (PDA). In addition, the electronic device may be any one portable electronic device including a device having two or more functions among the above-described devices.

The electronic device 800 includes a memory 810, a processor module 820, a first wireless communication subsystem 830, a second wireless communication subsystem 831, an external port 860, an audio subsystem 850, a speaker 851, a microphone 852, an input/output (I/O) system 870, a touchscreen 880, and other input/control devices 890. The memory unit 810 and the external port 860 may be provided in plurality.

The processor module 820 may include a memory interface 821, at least one processor 822, and a peripheral interface 823. In some cases, the processor module 820 will also be referred to as a processor. According to the present disclosure, the processor module 820 may determine whether a reply e-mail is received by a second time from all recipients which have sent a group e-mail including a request for a reply, and then determine whether a predetermined first time and/or predetermined second time has elapsed. In addition, the processor module 820 may be tasked with generating a reply report utilizing a predetermined format when the first time has elapsed, and to save and/or display the reply report using the predetermined format. The processor module 820 may also perform classification of recipients into a group of repliers that have replied, and a group of non-repliers that have not replied. The processor module 820 may further include a content of each replier's e-mail reply in the reply report, according to the predetermined format.

The processor module 820 executes various software programs to perform various functions for the electronic device 800, and performs processes and controls for voice communication and data communication. In addition to these general functions, the processor 822 executes a specific software module (instruction set) stored in the memory 810 and performs various specific functions corresponding to the software module. That is, the processor 822 performs processes related to example embodiments according to the present disclosure in, for example, conjunction with software modules stored in the memory 810.

The processor 822 may include at least one data processor, image processor, or codec. The data processor, the image processor, or the codec may be configured separately. Also, the processor 822 may be configured as a plurality of processors performing different functions. The peripheral interface 823 connects various peripheral devices and the I/O subsystem 870 of the electronic device 800 to the processor 822 and the memory 810 (through the memory interface).

The various elements of the electronic device 800 may be coupled by at least one communication bus (not illustrated) or stream line (not illustrated).

The external port 860 is used to connect a portable electronic device (not illustrated) to other electronic devices directly or indirectly through a network (for example, Internet, intranet, or wireless LAN). The external port 860 may be, for example, a universal serial bus (USB) port or a FireWire port, but is not limited thereto.

A motion sensor 891 and an optical sensor 892 may be connected to the peripheral interface 823 to enable various functions. For example, the motion sensor 891 and the optical sensor 892 may be connected to the peripheral interface 823 to detect a motion of the electronic device and detect light from the outside. In addition, other sensors such as a positioning system, a temperature sensor, and a biosensor may be connected to the peripheral interface 823 to perform relevant functions.

A camera subsystem 893 may perform camera functions such as photographing and video clip recording.

The optical sensor 892 may include a CCD (charged coupled device) or a CMOS (complementary metal-oxide semiconductor) device.

A communication function is performed through one or more wireless communication subsystems 830 and 831. The wireless communication subsystems 830 and 831 may include a radio frequency (RF) receiver and transceiver and/or an optical (e.g., infrared) receiver and transceiver. The first wireless communication subsystem 830 and the second wireless communication subsystem 831 may be divided according to communication networks through which the electronic device 800 performs communication. For example, the communication networks may include, but are not limited to, a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. The first wireless communication subsystem 930 and the second wireless communication subsystem 831 may be integrated with each other as one wireless communication subsystem.

The audio subsystem 850 is connected to the speaker 851 and the microphone 852 to perform audio stream input/output functions such as voice recognition, voice replication, digital recording, and phone functions. That is, the audio subsystem 850 communicates with the user through the speaker 851 and the microphone 852. The audio subsystem 850 receives a data stream through the peripheral interface 823 of the processor module 820 and converts the received data stream into an electric stream. The electric stream is transmitted to the speaker 851. The speaker 851 converts the electric stream into sound waves audible by humans and outputs the same. The microphone 852 converts sound waves received from humans or other sound sources into an electric stream. The audio subsystem 850 receives an electric stream from the microphone 852. The audio subsystem 850 converts the received electric stream into an audio data stream and transmits the audio data stream to the peripheral interface 823. The audio subsystem 850 may include an attachable/detachable earphone, a headphone, or a headset.

The I/O subsystem 870 may include a touchscreen controller 871 and/or some other input controller 872. The touchscreen controller 871 may be connected to the touchscreen 880. The touchscreen 880 and the touchscreen controller 871 may detect a touch, a motion, or a stop thereof by using multi-touch detection technologies including, but are not limited to, a proximity sensor array or other elements, as well as capacitive, resistive, infrared and surface acoustic wave technologies for determining one or more touch points on the touchscreen 880. The other input controller 872 may be connected to the other input/control devices 890. The other input/control device 890 may include one or more buttons, a rocker switch, a thumb wheel, a dial, a stick, and/or a pointer device such as a stylus.

The touchscreen 880 provides an I/O interface between the electronic device 800 and the user. That is, the touchscreen 880 transmits a user touch input to the electronic device 800. Also, the touchscreen 880 is a medium that displays an output from the electronic device 800 to the user. That is, the touchscreen 880 displays a visual output to the user. The visual output may be represented by a text, a graphic, a video, or a combination thereof.

The touchscreen 880 may use various display technologies. For example, the touchscreen 1080 may use an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED). The touchscreen 880 according to the present disclosure may receive a command for requesting a reply e-mail and a request reply time.

The memory 810 may be connected to the memory interface 821. The memory unit 810 may include one or more high-speed random-access memories (RAMs) such as magnetic disk storage devices, one more nonvolatile memories, one or more optical storage devices, and/or one or more flash memories (for example, NAND flash memories or NOR flash memories).

The memory 810 stores software. Software components include an operation system (OS) module 811, a communication module 812, a graphic module 813, a user interface (UI) module 814, a codec module 815, a camera module 816, and one or more application modules 817. Also, since the module may be a software component that may be represented as a set of instructions, the module may be referred to as an instruction set. The module may also be referred to as a program. The OS module 811 (for example, WINDOWS, LINUX, Darwin, RTXC, UNIX, OS X, or an embedded OS such as VxWorks) includes various software elements for controlling general system operations. For example, general system operation controls may include memory control/management, storage hardware (device) control/management, and power control/management. The OS module also performs a function for enabling smooth communication between various hardware elements (devices) and software elements (modules).

The communication module 812 may enable communication with other electronic devices (such as computers, servers, and/or portable terminals) through the wireless communication subsystems 830 and 831 or the external port 860. According to the present disclosure, the communication module 812 may send an e-mail for requesting a reply e-mail to arrive by a first time to e-mail addresses of at least two recipients and when there is at least one recipient from which the reply e-mail is not received by the second time, send a remind e-mail to an e-mail address of the at least one recipient from which the reply e-mail is not received. In addition, the communication module 812 may transmit an input e-mail content and an input request reply time together to the e-mail addresses of at least two recipients. The communication module 812 may transmit a generated reply report to a predetermined e-mail address.

The graphic module 813 includes various software elements for providing and displaying graphics on the touchscreen 880. The graphics may include text, web pages, icons, digital images, videos, or animations, etc.

The UI module 814 includes various software elements related to a user interface. Through the user interface module, the electronic device provides information about how the state of a user interface changes and/or information about under what condition the state of a user interface changes.

The codec module 815 may include software elements related to video file encoding/decoding. The codec module may include a video stream module such as an MPEG module or an H204 module. Also, the codec module may include various audio file codec modules such as AAA, AMR, and WMA. Also, the codec module 815 includes an instruction set corresponding to the implementation methods of the present disclosure.

The camera module 816 may include camera-related software elements that enable camera-related processes and functions.

The application module 817 includes a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or nonvolatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

While the present disclosure has been shown and described with reference to certain example embodiments thereof, it will be understood by those skilled in the art that various changes in form and details may be made therein without departing from the present disclosure as defined by the appended claims. Therefore, the limits of the present disclosure are defined not by the detailed description of the present disclosure but by the appended claims, and all differences within the scope will be construed as being included in the present disclosure.

What is claimed is:

1. A method for managing a group e-mail transmission in an electronic device, comprising:
   transmitting a group e-mail message to at least two recipients, the group e-mail message including at least a request for a reply e-mail to be received by a first time;
   detecting, via a processor, whether reply e-mails are received from each recipient of the at least two recipients by a predetermined second time;
   when the reply e-mail has not been received from at least one recipient of the at least two recipients by the predetermined second time, transmitting a reminder e-mail to a recipient from whom the reply e-mail was not received; and
   generating a reply report having a predetermined format in response to the first time elapsing, the predetermined format of the reply report summarizing reply e-mails received from the at least two recipients and including icons displayed on a screen of the electronic device, the icons selectable for transmitting a first pre-stored message to first recipients from whom first reply e-mails are received after transmitting requests for the first reply e-mails to be received by the first time to the first recipients and a second pre-stored message to second recipients from whom second reply e-mails are not received after transmitting requests for the second reply e-mails to be received by the first time to the second recipients.

2. The method of claim 1, further comprising:
   receiving at least one input indicating the request for the reply e-mail should be included in the group e-mail message.

3. The method of claim 2, wherein the at least one input further comprises a value setting the first time.

4. The method of claim 1, wherein the second time is a predetermined time set earlier than the first time.

5. The method of claim 1, further comprising determining whether the first time has elapsed.

6. The method of claim 1, further comprising:
   in response to detecting successful storage of the reply report in a memory of the electronic device, outputting an audio signal indicating the successful storage and a location in the memory to which the reply report is stored.

7. The method of claim 6, wherein the predetermined format comprises: classification of the at least two recipients into either "repliers" from whom reply e-mails have been received, and "non-repliers" from whom reply e-mails have not been received, and
   provision of a reply rate indicating a percentage of recipients from among the at least two recipients that have replied to the group e-mail by the first time.

8. The method of claim 6, further comprising transmitting the generated reply report to a predetermined e-mail address.

9. The method of claim 6, further comprising storing the generated reply report in a predetermined storage area.

10. The method of claim 6, wherein the predetermined format comprises at least one content of each reply e-mail for each "replier."

11. An electronic device comprising:
    a memory for storing data; and
    a processor operatively coupled to the memory, and configured to:
    transmit a group e-mail message to at least two recipients, the group e-mail message including at least a request for a reply e-mail to be received by a first time,
    detecting whether reply e-mails are received from each recipient of the at least two recipients by a predetermined second time,
    when the reply e-mail has not been received from at least one recipient of the at least two recipients by the predetermined second time, transmit a reminder e-mail to a recipient from where the reply e-mail was not received, and
    generating a reply report having a predetermined format in response to the first time elapsing, the predetermined format of the reply report summarizing reply e-mails received from the at least two recipients and including icons displayed on a screen of the electronic device, the icons selectable for transmitting a first pre-stored message to first recipients from whom first reply e-mails are received after transmitting requests for the first reply e-mails to be received by the first time to the first recipients and a second pre-stored message to second recipients from whom second reply e-mails are not received after transmitting requests for the second reply e-mails to be received by the first time to the second recipients.

12. The electronic device of claim 11, the processor further configured to receive at least one input indicating the request for the reply e-mail should be included in the group e-mail message.

13. The electronic device of claim 11, wherein the at least one input further comprises a value setting the first time.

14. The electronic device of claim 11, wherein the second time is a predetermined time set earlier than the first time.

15. The electronic device of claim 11, wherein the processor is further configured to determine whether the first time has elapsed.

16. The electronic device of claim 11, wherein the processor is further configured to:
    in response to detecting successful storage of the reply report in a memory of the electronic device, output an audio signal via an audio subsystem of the electronic device indicating the successful storage and a location in the memory to which the reply report is stored.

17. The electronic device of claim 1, wherein the predetermined format comprises:
    classification of the at least two recipients into either "repliers" from whom reply e-mails have been received, and "non-repliers" from whom reply e-mails have not been received, and
    provision of a reply rate indicating a percentage of recipients from among the at least two recipients that have replied to the group e-mail by the first time.

18. The electronic device of claim 16, wherein the processor is further configured to transmit the generated reply report to a predetermined e-mail address.

19. The electronic device of claim 16, wherein the processor is further configured to store the generated reply report in a predetermined storage area of the memory.

20. The electronic device claim 17, wherein the predetermined format comprises at east one content of each reply e-mail for each "replier."

* * * * *